(12) United States Patent
Walton

(10) Patent No.: US 9,037,957 B2
(45) Date of Patent: May 19, 2015

(54) PRIORITIZING ASSET LOADING IN MULTIMEDIA APPLICATION

(75) Inventor: Robert Walton, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 51 days.

(21) Appl. No.: 13/193,904

(22) Filed: Jul. 29, 2011

(65) Prior Publication Data

US 2014/0304576 A1    Oct. 9, 2014

(51) Int. Cl.
*G06F 9/50* (2006.01)

(52) U.S. Cl.
CPC .......................................... *G06F 9/50* (2013.01)

(58) Field of Classification Search
CPC ............................ G06F 9/50; G06F 2209/485
USPC .......................................................... 715/201
See application file for complete search history.

(56) References Cited

U.S. PATENT DOCUMENTS

| | | | |
|---|---|---|---|
| 5,778,372 A | 7/1998 | Cordell et al. | |
| 5,956,039 A * | 9/1999 | Woods et al. | 345/419 |
| 7,181,686 B1 | 2/2007 | Bahrs | |
| 7,761,423 B1 | 7/2010 | Cohen | |
| 7,860,878 B2 * | 12/2010 | Thrall et al. | 707/766 |
| 7,904,877 B2 | 3/2011 | Multerer et al. | |
| 8,291,424 B2 * | 10/2012 | McLean | 718/104 |
| 2003/0225829 A1 | 12/2003 | Pena et al. | |
| 2004/0205514 A1 | 10/2004 | Sommerer et al. | |
| 2005/0234893 A1 | 10/2005 | Hirsch | |
| 2006/0069617 A1 * | 3/2006 | Milener et al. | 705/14 |
| 2006/0259585 A1 | 11/2006 | Keohane et al. | |
| 2007/0011665 A1 | 1/2007 | Gandhi et al. | |
| 2007/0055660 A1 | 3/2007 | Anderson | |
| 2007/0245048 A1 | 10/2007 | Mesut et al. | |
| 2008/0056678 A1 | 3/2008 | Kim | |
| 2008/0104113 A1 | 5/2008 | Wong et al. | |
| 2008/0148166 A1 * | 6/2008 | Brunswig et al. | 715/766 |
| 2008/0189752 A1 | 8/2008 | Moradi et al. | |

(Continued)

FOREIGN PATENT DOCUMENTS

WO    WO2009124212    10/2009

OTHER PUBLICATIONS

U.S. Appl. No. 12/032,440, filed Feb. 15, 2008.
Office Action dated Apr. 28, 2010 in U.S. Appl. No. 12/032,440.
Office Action dated Oct. 5, 2010 in U.S. Appl. No. 12/032,440.

(Continued)

*Primary Examiner* — Kavita Padmanabhan
*Assistant Examiner* — Tionna Burke
(74) *Attorney, Agent, or Firm* — Kilpatrick Townsend & Stockton LLP

(57) ABSTRACT

Exemplary embodiments involve an application receiving an instruction to load assets, determining a priority of each of the assets, and loading at least some of the assets based on the priority. In one embodiment, the application prioritizes the loading of assets based on the accessibility of the views in which the assets are used and the resource requirements for loading the assets. In another embodiment, the application prioritizes the loading of assets based on determining a location at which each asset is stored. In another embodiment, the application prioritizes the loading of assets based on an attribute associated with rendering each of the assets for display. In another embodiment, the application prioritizes the loading of assets on which of the assets are used in one or more related views associated with the currently displayed view.

18 Claims, 6 Drawing Sheets

(56) References Cited

U.S. PATENT DOCUMENTS

2009/0007132 A1* 1/2009 Berretta .................. 718/104
2009/0132633 A1 5/2009 Jaffe et al.

OTHER PUBLICATIONS

Office Action dated Jan. 20, 2011 in U.S. Appl. No. 12/032,440.
Office Action dated Jul. 21, 2011 in U.S. Appl. No. 12/032,440.

* cited by examiner

US 9,037,957 B2

PRIORITIZING ASSET LOADING IN MULTIMEDIA APPLICATION

TECHNICAL FIELD

This disclosure relates generally to computer software and more particularly relates to prioritizing the loading of assets in a multimedia application.

BACKGROUND

Multimedia applications executed at computing devices can simultaneously integrate multiple types of content into a single view. To do so, multimedia applications load and render content items, referred to herein as "assets." Assets can include, but are not limited to, images, videos, audio files, text, and animation files. An example of a multimedia application is a digital magazine application that displays a view corresponding to each page of an issue of a digital magazine. When a user views a page in an article, image files, video files, and text files may be simultaneously rendered in the displayed view.

Simultaneously rendering multiple assets in a view of a multimedia application requires the allocation of computing resources, such as processing time and memory, to load the assets. Allocating computing resources can present challenges, particularly with respect to multimedia applications for mobile devices, such as smart phones or personal digital assistants. Mobile devices loading a mobile version of a multimedia application may have fewer processing and memory resources available to render the assets used in a view as compared to a desktop computer loading the same multimedia application.

One solution for resource-allocation problems is to use clipping algorithms when displaying multimedia assets on a resource-limited platform. Multimedia applications using clipping algorithms may load into memory only those assets or portions of an asset being displayed. For example, if a user of an image editing program has zoomed in to view only the top half of the image, the image editing program can use a clipping algorithm to allocate resources to loading and rendering only the top half of the image rather than allocating resources needed to render the lower half of the image. "Clipping" the lower half of the image thereby conserves resources.

Clipping algorithms can sacrifice responsiveness. For example, the user of digital magazine application may wish to access content included in pages accessible from the currently displayed page. The digital magazine application may conserve resources by only loading and rendering assets used in the currently displayed page and subsequently loading assets used in a second page accessible from the currently displayed page upon receiving a command to display the second page. Consequently, upon selecting the second page, the user must wait for the application to allocate resources for the loading and rendering of the assets used in the selected page view.

SUMMARY

Systems and methods for prioritizing the loading of assets based on various criteria are disclosed. One embodiment involves an application executed by a processor receiving an instruction to load assets. The application can determine a priority of each of the assets based on determining whether each of the assets is used in one or more accessible views that are directly accessible from a view currently displayed by the application. The application loads at least some of the assets into a memory based on the priority of the assets.

Another embodiment involves an application executed by a processor receiving an instruction to load assets. The application can determine a priority of each of the assets based on determining a resource requirement for loading each of the assets. The application loads at least some of the assets into a memory based on the priority of each of the assets.

Another exemplary embodiment involves an application executed by a processor receiving an instruction to load assets. The application can determine a priority of each of the assets based on determining an attribute associated with rendering each of the assets for display. The application loads at least some of the assets into a memory based on the priority of each of the assets.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
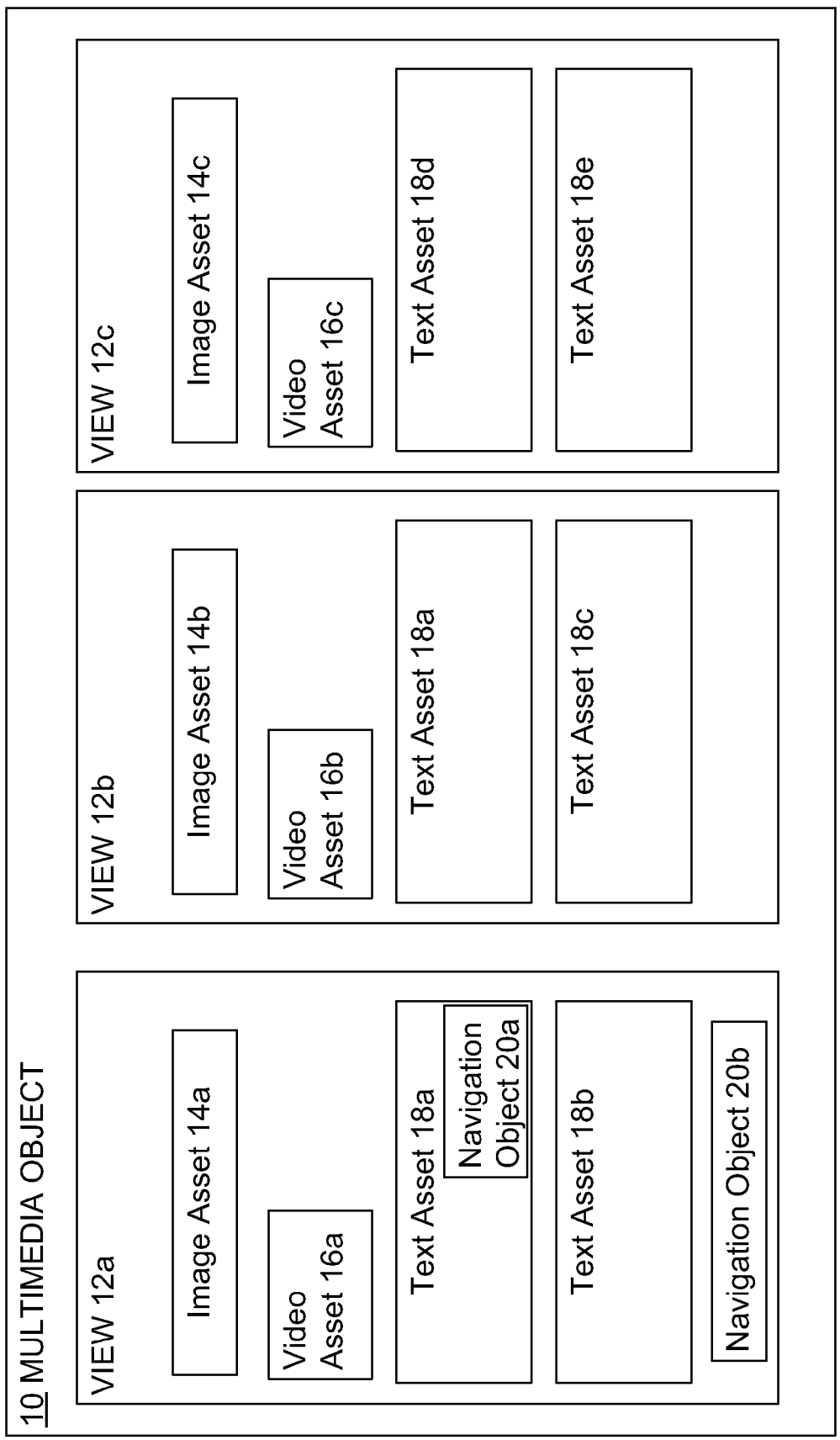
FIG. 1 is a block diagram depicting an exemplary multimedia object.

Computer-implemented systems and methods are disclosed for loading assets of an application, such as a multimedia application, based on a priority of each asset. Upon receiving an instruction to load assets included in a view, a prioritization module of an application can determine a priority, based on various criteria, for each of the assets. The various criteria can include the accessibility of an asset, a computing resource requirement for loading the asset, and an attribute associated with rendering the asset for display. The application can load each of the assets based on the priority determined by the prioritization module.

As used herein, the term "asset" is used to refer to a content item included in a multimedia object, such as text, images, videos, or audio files. As used herein, the term "image asset" is used to refer to a digital image included in a multimedia object. As used herein, the term "video asset" is used to refer to a video file included in a multimedia object. As used herein, the term "text asset" is used to refer to text included in a multimedia object.

As used herein, the term "loading" an asset is used to refer to copying or transferring an asset from a data source to a physical memory in a computing system. As used herein, the term "priority" of loading an asset is used to refer to an order in which computing resources, such as physical memory or processing time, are used for rendering the asset.

As used herein, the term "view" is used to refer to a layout that can include multiple assets simultaneously displayed or otherwise used at a given time or in a given state on a display screen of a computing device. For example, each article in a multi-article electronic article may be provided for display in one or more different views, e.g. a first article may be provided for display in a horizontal view and a vertical view while a second article is available for display only in a view that is the same for both horizontal and vertical viewing. As another example, each page of an article can be provided as an individual view. As yet another example, different portions of a document can be separated into separate views.

The following example illustrates how a prioritization module of an application prioritizes asset loading, thereby balancing conservation of computing resources with responsiveness of the application. A developer may design a multimedia application for displaying an issue of a digital magazine. Each page of the digital magazine may correspond to a view in the multimedia application. The developer may include a prioritization module in the multimedia application configured to prioritize the loading of assets based on what content a reader of the magazine is expected to access. For example, if a first page of an article is displayed, the reader may be expected to navigate to adjacent pages of the same article. In addition, the reader may also be expected to navigate to pages that are immediately accessible from the currently displayed page, such as related articles linked to the currently displayed page or other articles in the same section of the digital magazines, such as articles in the "Technology" section of a news magazine. Assets used in adjacent or immediately accessible pages may be assigned a higher loading priority.

Accordingly, a multimedia application can load prioritized assets associated with views accessible from a currently displayed view while a user is accessing the content of the currently displayed view (e.g., reading a page of an article in a digital magazine). If the user navigates to views accessible from the currently displayed view, the accessible views can be displayed more quickly than if the multimedia application had loaded the assets associated with those pages only after receiving the command to navigate to those pages.

As discussed in the above example, an application can prioritize an asset based on whether the asset is used in a view that is accessible from a currently displayed view. The prioritization module of an application can assign a higher priority to assets used in views accessible from the currently displayed view as compared to a priority assigned to assets not used in views accessible from the currently displayed view.

The determining of whether an asset is accessible from a currently displayed view can include determining whether an asset is included in a view adjacent to a currently displayed view. As used herein, the term "adjacent view" is used to refer to a view accessible by using a command in the currently displayed view to navigate to a view immediately following or preceding the currently displayed view in a series of views. For example, if a page of an article in a digital magazine is currently displayed, adjacent views would include the page immediately preceding and the page immediately following the currently displayed page. In an exemplary embodiment, a prioritization module can prioritize the loading of assets included in adjacent views.

The determining of whether an asset is accessible from a currently displayed view can additionally or alternatively include determining whether the currently displayed view includes a navigation object for accessing or navigating to a view including the asset. As used herein, the term "navigation object" is used to refer to an object configured to access or navigate to another view from one of the views 12a-c currently being displayed in response to receiving user input. One example of a navigation object is a link to a related article in a digital magazine. Another example of a navigation object is a "home" button in an application allowing a user to return to the first view displayed when opening the application.

The determining of whether an asset is accessible from a currently displayed view can additionally or alternatively include determining whether the asset is used in a view accessible via a touch screen navigation gesture command received in the currently displayed view. As used herein, the term "touch screen navigation gesture command" is used to refer to input received by a multimedia application via a touch screen interface and representing a command to access or navigate to another view from one of the views 12a-c.

In one embodiment, assets included in views accessible from the currently displayed view are identified as prioritized assets, while assets not included in views accessible from the currently displayed view are identified as non-prioritized assets. In another embodiment, assets are assigned tiers of priorities based on how many views removed the assets are from a currently displayed view. For example, assets used in primary views, which may be those views that are accessible from a currently displayed view, may be assigned a primary priority. Assets used in secondary views, defined as those views accessible from a primary view but not the currently displayed view, may be assigned a secondary priority that is lower than a primary priority.

A prioritization module can additionally or alternatively prioritize assets included in views accessible from the currently displayed view based on the available computing resources in a computing device. The prioritization module may determine the available computing resources in the computing device. Based on the available computing resources of the computing device, the prioritization module may only prioritize assets capable of being loaded. For example, a prioritization module may determine that a computing device has a specific amount of physical memory or processing time available for loading assets other than those included in a currently displayed view. The available physical memory or processing time may support loading only assets used in primary views. The prioritization module can therefore assign priorities to assets included in primary views and not assign priorities to assets included in secondary views.

The determining of whether an asset is accessible from a currently displayed view can additionally or alternatively include determining a location at which the asset is stored. For example, an application may receive an instruction to load assets stored in memory at a computing device executing the application and assets stored at a remote location accessible through a network. Assets stored in memory at the computing device may require fewer computing resources to load than assets accessed through the network. Assets stored in memory may be assigned a lower priority than assets accessed through the network.

The determining of a priority for an asset can additionally or alternatively be based on a resource requirement for use of the asset. A resource requirement can include an amount of memory for loading each of the assets. A resource requirement can additionally or alternatively include a processing time required for loading the asset on a particular device. For example, an application may receive an instruction to load multiple assets. One asset may require more processing time to load than the second asset. A prioritization module of the application can assign a higher priority to the asset requiring more processing time, or vice versa.

The determining of a priority for an asset can additionally or alternatively be based on an attribute associated with rendering the asset for display at a computing device. As used herein, the term "attribute associated with rendering the asset" is used to refer to an attribute of an asset or multimedia object or an instruction in a multimedia application determining how the asset is rendered for display.

In one embodiment, an attribute associated with rendering the asset can include a scaling factor for the asset. As used herein, the term "scaling factor" is used to refer to the magnification or zoom of an asset when rendered for display. For example, the application can receive an instruction to load certain assets in a subsequent view as thumbnail images (i.e., to "zoom out" from those assets) and to load other assets as full-size images (i.e., to "zoom in" on those images). The application can assign a higher priority to the zoomed-in assets than the zoomed-out assets.

In another embodiment, an attribute associated with rendering the asset identifies whether the asset is static or dynamic. Static assets can include assets that do not change when rendered for display. Examples of static assets can include text or images. Dynamic assets include assets that change when rendered for display. An example of a dynamic asset is a video, which includes a series of changing images that each persist for less than a second, or an animated slide show, which includes a series of changing images that persist for several seconds. In additional or alternative embodiments, a dynamic asset can include multiple related assets associated with the dynamic asset. For example, a dynamic asset that is a slide show can include related static assets that are text assets and image assets associated with the slide show, such as a series of images with captions.

The determining of a priority for an asset can additionally or alternatively be based on which of the assets are used in one or more related views corresponding to the currently displayed view. Related views can be defined by an application-specific rule. An application-specific rule can be used to identify other views that meet one or more criteria common to the currently displayed view. For example, a digital magazine application may be used to read a digital magazine with several articles. Each of the articles may include metadata, such as tags, identifying subject matter in the article. Several articles may have tags identifying subject matter common to the articles. For each page of an article, an application-specific rule for the digital magazine application may identify all views corresponding to the first page of articles with subject matter common to the currently displayed article as related views corresponding to the currently displayed view.

Various methods for prioritizing assets can be applied in any order. For example, a multimedia application can prioritize the loading of assets based on whether the assets are used in one or more related views. The multimedia application can further prioritize the assets based on the resource requirements for loading the assets. The multimedia application can further determine whether to prioritize assets with higher resource requirements over those with lower resource requirements based on, for example, whether the assets are stored at a remote location accessible through a network. For example, if a digital magazine application is accessing views over a low-speed data connection, a prioritization module of the digital magazine application can assign a higher priority to assets requiring fewer resources, such as text and low resolution graphics of a magazine article, than to assets requiring more resources that may be of less interest to a reader, such as a video embedded in the magazine article. Prioritizing the text of an article and low resolution graphics can allow the digital magazine application to display content of greater interest to a reader, such as the text of the article, while supplemental content of less interest to the reader, such as an embedded video, continues to load.

These illustrative examples are given to introduce the reader to the general subject matter discussed here and are not intended to limit the scope of the disclosed concepts. The following sections describe various additional embodiments and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a block diagram depicting an exemplary multimedia object. A multimedia object 10 can be a multimedia file used by a multimedia application. An example of a multimedia object 10 is an issue of a digital magazine displayed by a digital magazine application.

A multimedia object 10 can include several views 12a-c. A view can be a layout including multiple assets rendered simultaneously at a given time or state. For example, views 12a-c of a multimedia object 10 that is a digital magazine issue can include pages of an article, wherein each page corresponds to a different view 12a-c.

The assets included in a view can include image assets 14a-c, video assets 16a-c, and text assets 18a-e. Examples of image assets 14a-c include, but are not limited to, Joint Photographic Experts Group (JPEG) files, Exchangeable image file format (Exif) files, Tagged Image File Format (TIFF) files, Portable Network Graphics (PNG) files, GIF (Graphics Interchange Format) files, bitmap (BMP) files, etc. In a view corresponding to a page of a digital magazine issue, the image assets 14a-c can include, for example, a logo for the digital magazine at the top of each view 12a-c as well as pictures accompanying the text of an article. Examples of video assets 16a-c can include Moving Picture Experts Group (MPEG) files, Audio Video Interleave (AVI) files, Windows® Media Video (WMV) files, etc. In some embodiments, one or more of image assets 14a-c and video assets 16a-c can be delivered via a Small Web Format (SWF) file. In a view corresponding to a page of a digital magazine issue, the video assets 16a-c can be, for example, a news video related to the content of the article. Examples of text assets 18a-c can include HTML files, rich text format files, plain text files, etc. In a view corresponding to a page of a digital magazine issue, the text assets 18a-c can include, for example, text displayed on a page of an article.

The views 12a-c can also include navigation objects 20a-b. In one embodiment, a navigation object included in one view can be a link to another view. For example, if a view 12a corresponds to a page of an article in a digital magazine issue, a user may immediately navigate to a view 12b, corresponding to a page of a related article, using a navigation object 20a that is a link referencing the related article. In another embodiment, a navigation object can be a button, such as a "home" button, configured to access one of the views 12a-c. For example, if a view 12a corresponds to a page of an article in a digital magazine issue, a user may immediately navigate to a view 12c, corresponding to a table of contents for an issue of a digital magazine, using a navigation object 20b that is a button for accessing the table of contents for the issue.

Figure 2:
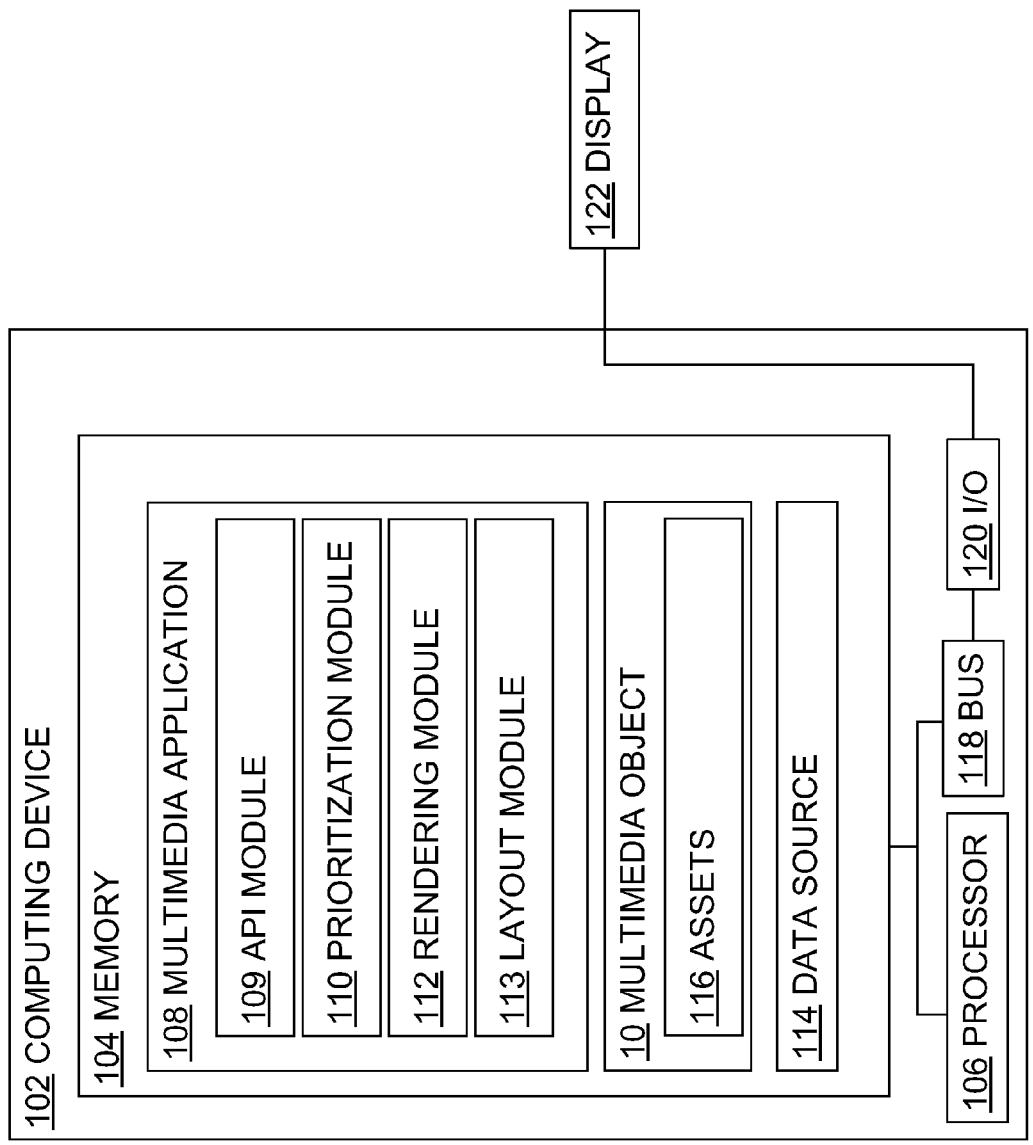
FIG. 2 is a block diagram depicting exemplary computing devices in an exemplary computing environment for implementing certain embodiments.

FIG. 2 is a block diagram depicting exemplary computing devices in an exemplary computing environment for implementing certain embodiments. A multimedia application 108 executes or is otherwise used on the exemplary computing device 102 and is shown using functional components or modules. As is known to one of skill in the art, such applications may be resident in any suitable non-transitory computer-readable medium and execute on any suitable processor.

For example, as shown, an exemplary computing device 102 can include a non-transitory computer-readable medium, such as a random access memory (RAM) 104, coupled to a processor 106 that executes computer-executable program instructions and/or accesses information stored in a memory 104. Such a processor 106 may include a microprocessor, an application-specific integrated circuit (ASIC), a state machine, or other processor, and can be any of a number of computer processors. Such a processor can include, or may be in communication with a non-transitory computer-readable medium which stores instructions that, when executed by the processor 106, cause the processor 106 to perform the steps described herein.

A non-transitory computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing device 102 may also comprise a number of external or internal devices such as a mouse, a CD-ROM, DVD, a keyboard, a display, audio speakers, one or more microphones, or any other input or output devices. A user can use the external devices to provide input to and receive output from the computing device 102 via input/output (I/O) interface 120. For example, computing device 102 is shown with a display 122. A bus, such as bus 118, is included in the computing device 102. Computing device 102 could be a personal computing device, a mobile device, or any other type of electronic device appropriate for providing one or more of the features described herein. In one exemplary embodiment, computing device 102 is a mobile device such as a smart phone or personal digital assistant.

FIG. 2 illustrates an exemplary computing device 102 that includes, in a memory 104, a multimedia application 108 and a multimedia object 10. The multimedia application 108 can configure the processor 106 to retrieve assets 116 included in the multimedia object 10 from a data source 114, load the assets 116 into the memory 104, and render the assets 116 for display. The assets 116 can include, but are not limited to, image assets 14a-c, video assets 16a-c, and text assets 18a-e. In alternative embodiments, the data source 114 may be included within the memory 104 or provided from a separate server or other external location. A data source 114 can be any source of data that provides data upon request, pushed data, or otherwise provides data items for use by a multimedia application 108. For example, a data source 114 may be a fixed collection of data, such as a file, or may be a source that streams or otherwise provides data.

As depicted in FIG. 2, the multimedia application 108 includes an Application Programming Interface (API) module 109, a prioritization module 110, a rendering module 112, and a layout module 113. The API module 109 can include one or more modules for coordinating communication between the prioritization module 110, the rendering module 112, and the layout module 113. The API module 109 can also receive and process data generated from user input received via I/O interface 120. The API module 109 can also retrieve assets 116 from data source 114 and load the assets 116 into the memory 104. The prioritization module 110 can include one or more modules for assigning priorities to assets.

The rendering module 112 can include one or more software modules configured for managing renderers for assets 116. As used herein, the term "renderer" is used to refer to a software module that can generate a visual representation of a specific data item for display at an output device.

The layout module 113 can include one or more modules for combining assets 116 in a view. Combining assets 116 in a view can include positioning the assets 116 in the view and rendering the assets 116 using the renderers assigned by the rendering module 112.

Figure 3:
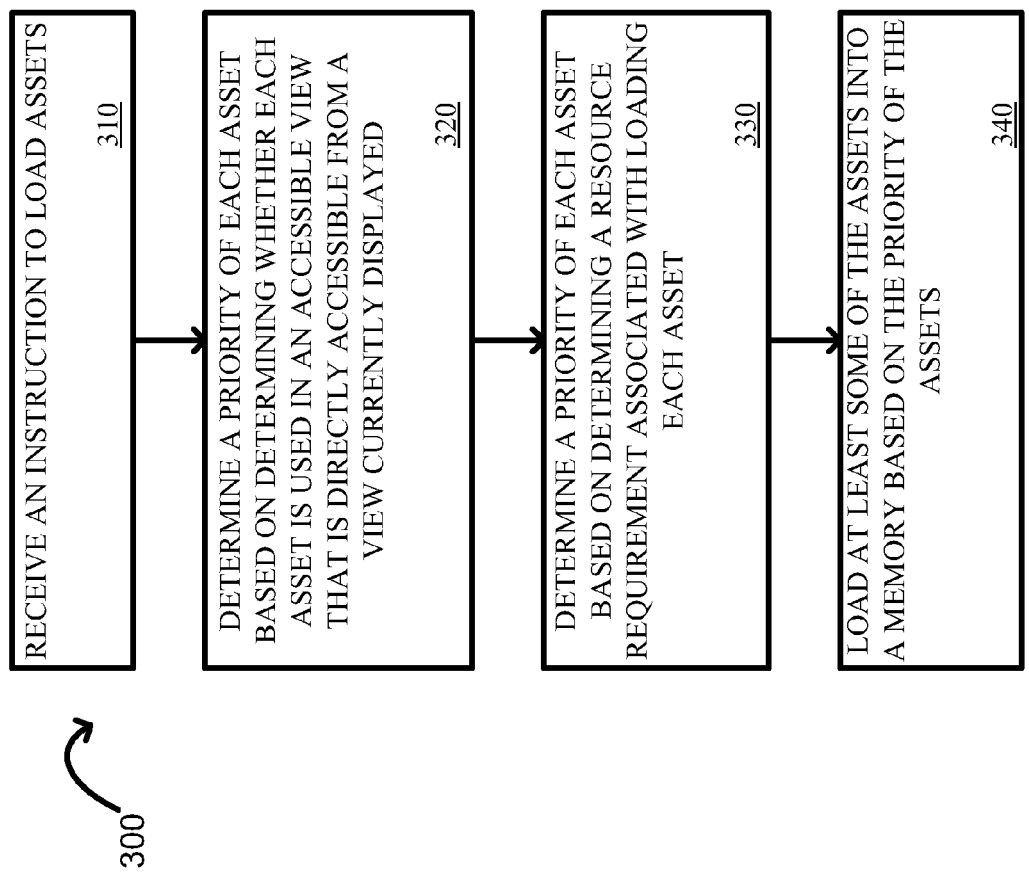
FIG. 3 is a flow chart illustrating an exemplary method for prioritizing the loading of assets based on the accessibility of the views in which the assets are used and the resource requirements for loading the assets.

FIG. 3 is a flow chart illustrating an exemplary method 300 for prioritizing the loading of assets based on the accessibility of the views in which the assets are used and the resource requirements for loading the assets. The exemplary method 300 involves receiving an instruction to load assets 116, as shown in block 310. The prioritization module 110 of multimedia application 108 can receive the instruction to load assets via the API module 109. In an exemplary embodiment, the API module 109 can determine the current view 12a. The API module 109 can provide an instruction to the prioritization module 110 to load the assets 116 based on the current view 12a. For example, when a user selects a current view 12a, an API module 109 may generate an instruction to load the assets 116 used in views to which a user may be capable of accessing next. The API module 109 may provide the load instruction to a prioritization module 110.

The exemplary method 300 further involves determining a priority of each of the assets 116 based on determining whether each of the assets is used in an accessible view that is directly accessible from a currently displayed view, as shown in block 320. The prioritization module 110 of the multimedia application 108 can determine the priority of the assets 116. In an exemplary embodiment, a current view 12a may be currently displayed, a view 12b may be accessible from the current view 12a, and a view 12c may not be accessible from the current view 12a. The prioritization module 110 can assign a higher priority to assets 116 used in a view 12b than assets 116 used in a view 12c not accessible from the current view 12a.

In one embodiment, the prioritization module 110 can identify assets 116 as either prioritized assets or non-prioritized assets. The prioritization module 110 can identify as prioritized assets the assets 116 used in the view 12b, where the view 12b is accessible from the currently displayed view 12a. The prioritization module 110 can identify as non-prioritized assets the assets 116 used in the view 12c, where the view 12c is not accessible from the currently displayed view 12a.

In another embodiment, the prioritization module 110 may assign different tiers of priorities, such as a primary and secondary priority, based on the accessibility of a given asset. For example, a view 12b may be accessible from a currently displayed view 12a and a view 12c, while not accessible from the currently displayed view 12a, may be accessible from the view 12b. A primary view 12b can be a view that is accessible from a currently displayed view 12a. A secondary view 12c can be a view that is directly accessible from a primary view 12b. The prioritization module 110 can assign a primary priority to the assets 116 used in a primary view 12b. The prioritization module 110 can assign a secondary priority to the assets 116 used in a secondary view 12c.

The determining of whether an asset 116 is used in a view that is directly accessible from the currently displayed view can include determining whether a respective asset 116 is used in a view 12b adjacent to the currently displayed view 12a. An adjacent view 12b can include a view either immediately preceding or immediately following a view 12a. A view 12b can be adjacent from a currently displayed view 12a when the user can navigate directly to a view 12b from currently displayed view 12a by paging or scrolling.

For example, in a multimedia object 10 that is a digital magazine issue, a currently displayed view 12a can be a page of an article currently being displayed to a reader. An adjacent view 12b can be a page of the article immediately following or preceding the page that is view 12a. A prioritization module 110 of a multimedia application 108 for using the digital magazine can determine that the view 12b is adjacent to view 12a. The prioritization module 110 can therefore prioritize the assets 116 used in the view 12b.

The determining of whether an asset 116 is used in a view that is directly accessible from a currently displayed view 12a can additionally or alternatively include determining whether the currently displayed view 12a includes a navigation object 20 associated an accessible view. The prioritization module 110 can identify views 12b-c to which a user can navigate using navigation objects 20a-b. The prioritization module 110 can therefore prioritize the assets 116 used in the views 12b-c.

For example, a multimedia object 10 can be an issue of a digital magazine. A currently displayed view 12a can be a page of an article. A navigation object 20a can include a link allowing a user to navigate to a related article in the issue, where the first page of the article is view 12b. A navigation object 20b can be a "home" button allowing a user to navigate to a table of contents for the issue of the digital magazine, where the table of contents is view 12c. A prioritization module 110 can determine that the views 12b-c are directly accessible from the currently displayed view 12a using navigation objects 20a-b. The prioritization module 110 can prioritize the assets 116 used in the views 12b-c.

The determining of whether an asset 116 is accessible from a currently displayed view 12a can additionally or alternatively include determining whether the asset is used in a view accessible via a touch screen navigation gesture command received in the currently displayed view 12a. The prioritization module 110 can identify the views 12b-c to which a user can navigate via a touch screen navigation gesture command. For example, the views 12b-c may be accessible in response to a user swiping a finger across a touch screen, where the swiping of the finger represents a command to scroll to the views 12b-c. The prioritization module 110 can therefore prioritize the assets 116 used in the views 12b-c.

The exemplary method 300 further involves determining a priority of each of the assets based on a resource requirement for loading each of the assets 116, as shown in block 330. The prioritization module 110 of the multimedia application 108 can determine the priority based on the resource requirement for loading each of the assets 116. A resource requirement can include an amount of memory for loading each of the assets. A resource requirement can additionally or alternatively include processing time required for loading the asset.

For example, the prioritization module 110 may receive an instruction to load a view 12b including multiple assets 116. One asset may be a video asset 16b. Other assets may be text assets 18a, 18c. The video asset 16b may require more memory or processing time to load than the text assets 18a, 18c. The prioritization module 110 may assign a higher priority to the video asset 16b than the text asset 18a, 18c. The prioritization module 110 may also determine that the text asset 18a is included in the currently displayed view 12a and is therefore already loaded. Accordingly, the prioritization module may identify the text asset 18a as a non-prioritized asset.

In an exemplary embodiment, assets 116 may be prioritized based on the accessibility of the view in which the assets 116 are used and be further prioritized based on the resource requirements required for loading the assets 116. The prioritization module 110 can assign a primary priority to assets 116 used in a primary view and a secondary priority to assets 116 used in a secondary view. The prioritization module 110 can further prioritize all assets 116 with a primary priority based on a resource requirement for loading each of the assets 116. In additional or alternative embodiments, a first prioritization module may prioritize assets based on the accessibility of the view in which the assets are used and a second prioritization module may further prioritize assets based on the resource requirements required for loading the assets.

In one embodiment, priorities assigned based on a resource requirement may determine the order in which each asset 116 included in a primary view is loaded. One asset 116 with a primary priority may have a higher priority based on a resource requirement than another asset 116 with a primary priority, but any asset 116 with a primary priority would be prioritized over an asset 116 with a secondary priority. In another embodiment, a prioritization module 110 may initially assign a higher priority to an asset 116 included in a primary view than an asset 116 included in a secondary view. The prioritization module 110 may then determine that the asset 116 included in the secondary view has a resource requirement that necessitates increasing the priority for the asset. The prioritization module 110 may therefore assign a higher priority to the asset 116 included in the secondary view than the asset 116 included in the primary view.

In additional or alternative embodiments, the prioritization module 110 can assign tiers of priorities based on the accessibility of the view in which the assets 116 are used and can determine how many tiers of priorities to assign based on the resource requirements for loading the assets 116. The prioritization module 110 may only assign priorities to those assets 116 capable of being loaded based on the resource requirement for loading the assets. In one example, a prioritization module 110 may determine that a computing device 102 has sufficient physical memory or processing time available to load assets used in both a primary view 12b and a secondary view 12c. Accordingly, the prioritization module 110 may assign both primary and secondary priorities to assets included in primary view 12b and secondary view 12c, respectively. In another example, a prioritization module 110 may determine that a computing device 102 only has sufficient physical memory or processing time available to load assets used in a view 12b accessible from a currently displayed view 12a, but not assets used in a view 12c accessible from a view 12b. Accordingly, the prioritization module 110 may identify assets used in the view 12b, but not assets used in the view 12c, as prioritized assets.

The exemplary method 300 further involves loading at least some of the assets 116 into the memory 104 based on the priority of the assets 116, as shown in block 340. To load the assets 116, the prioritization module 110 can provide a prioritized list of assets to the API module 109. The API module 109 can retrieve the assets 116 from the data source 114. The API module 109 can load the assets 116 into the memory 104 for use by the multimedia application 108.

In additional or alternative embodiments, the method 300 can further involve rendering at least some of the assets 116 for display at the computing device 102. To render the assets 116, the API module 109 can provide the prioritized list of assets to the rendering module 112. The rendering module 112 can determine the renderers required to render the assets 116 included in the prioritized list of assets. The rendering module 112 can provide a list of required renderers to the layout module 113 of the multimedia application 108. If the required renderers are not already loaded, the layout module 113 can load into the memory 104 the required renderers. The layout module 113 can render the prioritized assets 116 loaded in the memory 104 using the renderers.

Figure 4:
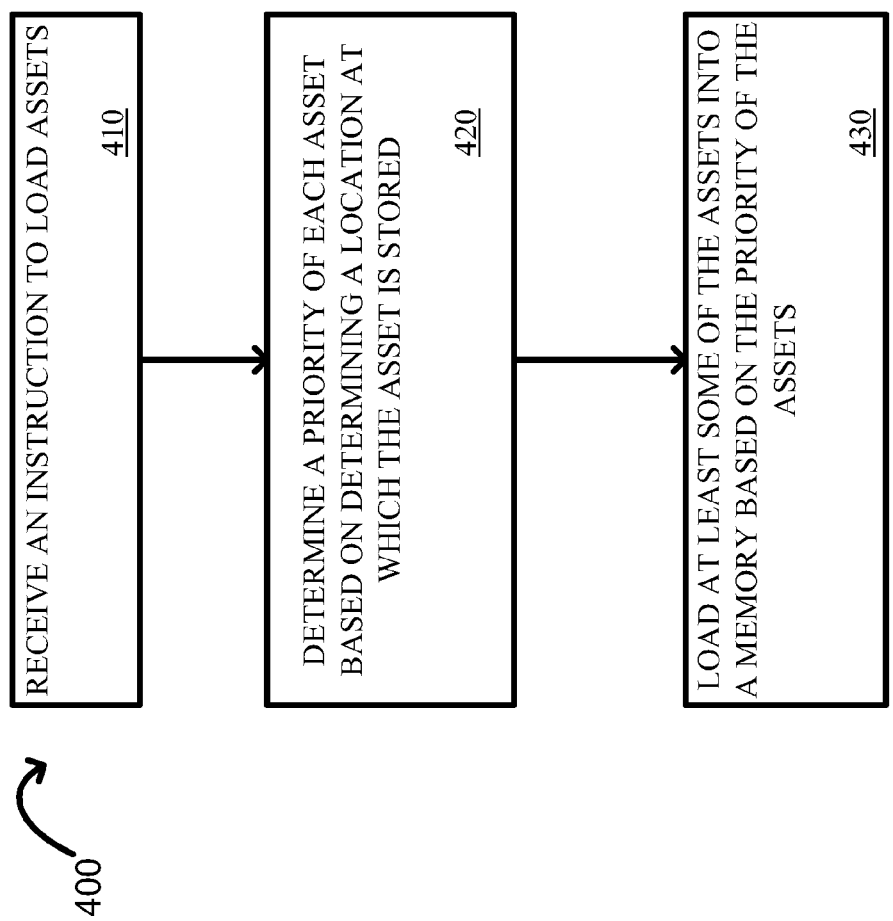
FIG. 4 is a flow chart illustrating an exemplary method for prioritizing the loading of assets based on a location at which each of the assets is stored.

FIG. 4 is a flow chart illustrating an exemplary method 400 for prioritizing the loading of assets based on a location at which each of the assets is stored. The exemplary method 400 involves receiving an instruction to load assets 116, as shown in block 410. The prioritization module 110 of the multimedia application 108 can receive an instruction to load assets, as shown in block 310 of the method 300.

The exemplary method 400 further involves prioritizing an asset 116 based on determining a location at which the asset 116 is stored, as shown in block 420. Different assets 116 can be stored at multiple data sources 114. A first data source 114 may be a local file stored in a memory 104. A second data source 114 may be remote server accessible via a network that streams or otherwise provides data. The prioritization module 110 can determine whether an asset 116 is remotely accessible or locally accessible. For example, a multimedia object 10 may include one or more XML files. The XML files may reference assets 116. A prioritization module 110 can determine whether a reference to an asset 116 in an XML file describes a local data source 114, such as a directory in a memory 104 of a computing device 102, or a remote data source 114, such as a server providing streaming media.

In one embodiment, the prioritization module 110 is configured to assign a higher priority to remotely accessible assets than to locally accessible assets. Accessing remote assets may require a computing device 102 to allocate memory and processing time to a network interface device and other services for communicating through a network, while accessing local assets may only require accessing a memory 104. A prioritization module 110 may be configured to detect the location at which the asset is stored and assign a lower priority to the local assets than to the remote assets accessed through the network. In another embodiment, the prioritization module 110 can be configured to assign a higher priority to locally accessible assets than to remotely accessible assets. For example, the prioritization module 110 can be configured to prioritize locally accessible assets over remotely accessible assets to avoid degrading the responsiveness of the multimedia application 108 executed at a resource-limited computing device 102.

The exemplary method 400 further involves loading at least some of the assets 116 into a memory 104 based on the priority of each of the assets 116, as shown in block 430. The API module 109 of the multimedia application 108 can load the assets into the memory 104, as shown in block 340 of the method 300.

Figure 5:
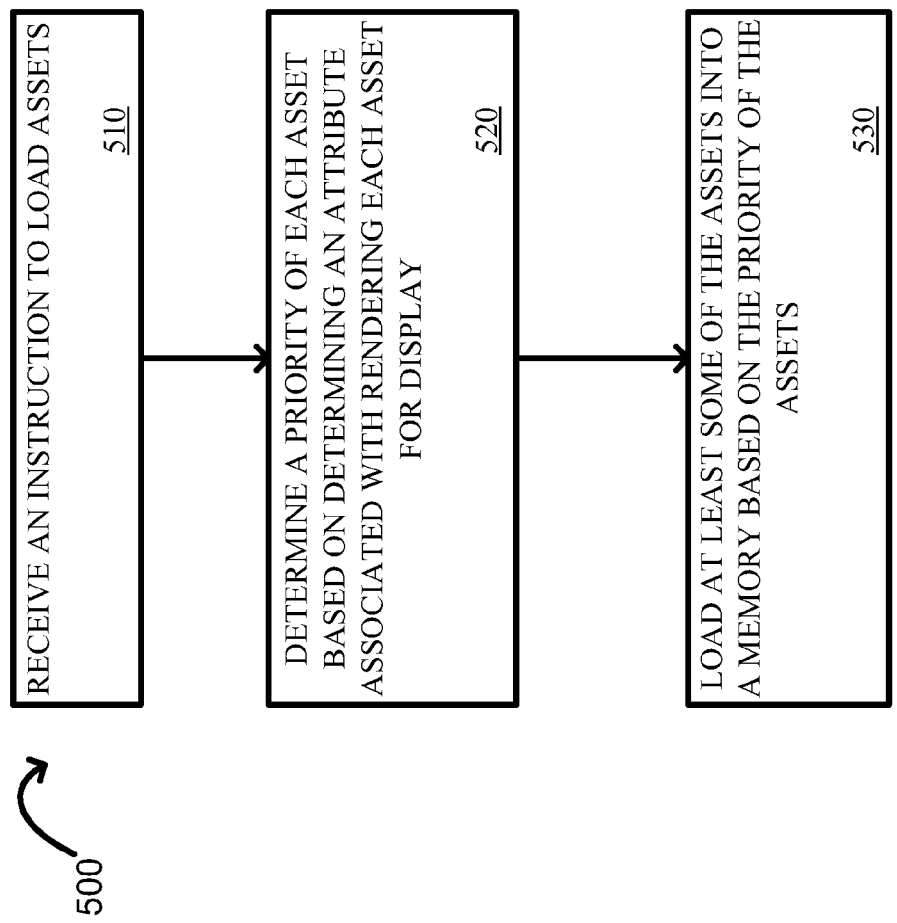
FIG. 5 is a flow chart illustrating an exemplary method for prioritizing the loading of assets based on an attribute associated with rendering each of the assets for display.

FIG. 5 is a flow chart illustrating an exemplary method 500 for prioritizing the loading of assets based on an attribute associated with rendering each of the assets for display. The exemplary method 500 involves receiving an instruction to load assets 116, as shown in block 510. The prioritization module 110 of the multimedia application 108 can receive an instruction to load assets, as shown in block 310 of the method 300.

The exemplary method 500 further involves determining a priority of each of the assets 116 based on determining an attribute associated with rendering each of the assets 116 for display, as shown in block 520. The prioritization module 110 of the multimedia application 108 can determine the priority based on the attributes associated with rendering the assets 116.

In one embodiment, an attribute associated with rendering the asset can be a scaling factor associated with the asset. A scaling factor can indicate a level of magnification at which to display an asset. For example, a view can include one asset displayed as a thumbnail (i.e., a "zoomed out" asset) and another asset displayed at its full size (i.e., a "zoomed-in" asset). An asset with a lower scaling factor, such as a thumbnail image, may have fewer details to render as compared to an asset with a higher scaling factor, such as a full-size image. More computing resources may be required to render assets with higher scaling factors, thereby increasing the time required to render the assets. A prioritization module 110 of a multimedia application 108 can be configured to assign a higher priority to the assets with a higher scaling factor.

In another embodiment, an attribute associated with rendering the asset can identify whether an asset 116 is static or dynamic. Static assets can include assets that do not change when rendered for display. Examples of static assets can include image assets 14a-c or text assets 18a-e. Dynamic assets include assets that change when rendered for display. An example of a dynamic asset is a video asset 16a-c, which includes a series of images that each persist for less than a second, or an animated slide show, which includes a series of images that persist for several seconds. Because the display of dynamic assets will change rapidly, loading dynamic assets may be an inefficient use of computing resources as opposed to loading static assets. A prioritization module 110 of a multimedia application 108 can therefore be configured to assign a higher priority to static assets than to dynamic assets.

The exemplary method 500 further involves loading at least some of the assets 116 into a memory 104 based on the priority of each of the assets 116, as shown in block 530. The API module 109 of the multimedia application 108 can load the assets into the memory 104, as shown in block 340 of the method 300.

Figure 6:
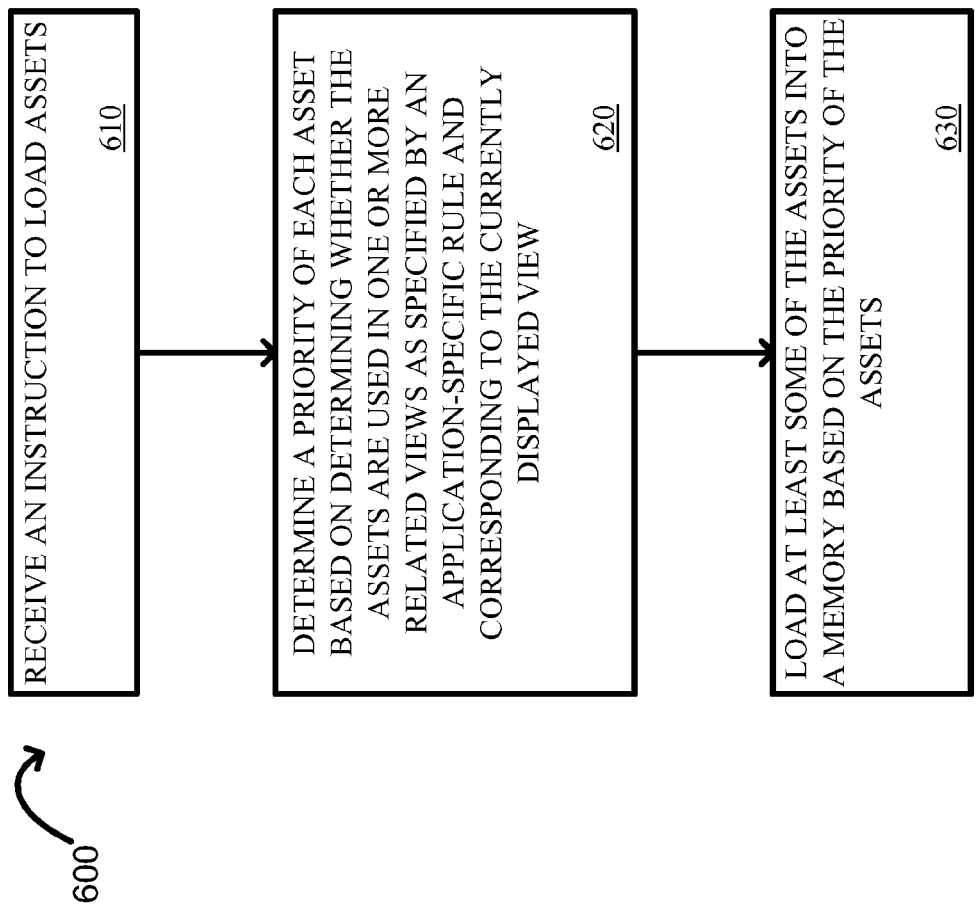
FIG. 6 is a flow chart illustrating an exemplary method for prioritizing the loading of assets based on which of the assets are used in one or more related views associated with the currently displayed view.

FIG. 6 is a flow chart illustrating an exemplary method 600 for prioritizing the loading of assets based on which of the assets are used in one or more related views associated with the currently displayed view. The exemplary method 600 involves receiving an instruction to load assets 116, as shown in block 610. The prioritization module 110 of the multimedia application 108 can receive an instruction to load assets, as shown in block 310 of the method 300.

The exemplary method 600 further involves determining a priority of each of the assets 116 based on whether the assets 116 are used in one or more related views associated with a currently displayed view, as shown in block 620. The prioritization module 110 of the multimedia application 108 can identify the related views using an application-specific rule. An application-specific rule can identify, for a currently displayed view, other views that meet one or more criteria common to both the currently displayed view and the related view. The prioritization module 110 can prioritize the assets 116 used in the related views.

Both the criteria and the conditions satisfying the criteria can be specified during the development of a multimedia application 108, and can therefore vary between different multimedia applications. In one example, a multimedia application 108 may be a digital magazine application for accessing a multimedia object 10 that is a digital magazine. The digital magazine application may provide for navigation to adjacent pages of an article by scrolling along a vertical axis and provide for navigation to adjacent articles by scrolling along a horizontal access. For a currently displayed page in an article, an application-specific rule may identify that other pages in the article, accessible via vertical scrolling, are related to the currently displayed page. Accordingly, the prioritization module 110 may prioritize assets used in views accessible via vertical scrolling, which correspond to pages related to the currently page based on their inclusion in a common magazine article, over views accessible via horizontal scrolling, which correspond to pages in adjacent articles.

In another example, a digital magazine application may be used to read a digital magazine with several articles. Each of the articles may include metadata, such as tags, identifying subject matter in the article. Several articles may have tags identifying subject matter common to the articles. For each page of an article, an application-specific rule for the digital magazine application may identify the first pages of articles with subject matter common to the currently displayed article as views related to the currently displayed view. The prioritization module 110 can therefore prioritize assets 116 used in the related views.

In another example, a digital magazine application may include a software module for tracking how frequently a method of accessing pages in a digital magazine is used. The software module can track how frequently pages are accessed via scrolling and how frequently views are accessed via navigation objects such as links. An application-specific rule can require that pages accessible via the most frequently used method of access be prioritized over other views. For example, the software module may determine that of the last twenty pages viewed, fifteen were accessed via scrolling and five were accessed via links from other pages. If pages are accessed via scrolling more frequently than pages are accessed via links, the higher frequency of scrolling can indicate that pages accessible via scrolling (e.g., the pages in a current article) should be prioritized over pages accessible via links. The prioritization module 110 can therefore prioritize assets used in views accessible via scrolling over assets used in views accessible via links.

The exemplary method 600 further involves loading at least some of the assets 116 into a memory 104 based on the priority of each of the assets 116, as shown in block 630. The API module 109 of the multimedia application 108 can load the assets into the memory 104, as shown in block 340 of the method 300.

While the FIGS. 3-6 depict distinct methods for prioritizing assets, a prioritization module 110 can execute these methods in combination to prioritize assets 116. A prioritization module 110 can be configured to execute the various methods for determining a priority for an asset in any order. For example, a prioritization module 110 can prioritize the loading of assets 116 based on whether the assets are used in one or more related views. The prioritization module 110 can further prioritize the assets 116 based on their accessibility. The prioritization module 110 can further prioritize the assets 116 based on the resource requirements for loading the assets.

For example, a multimedia application may be a digital magazine application displaying a multimedia object that is an issue of the digital magazine. The digital magazine issue can include a plurality of articles. Each article can include a plurality of views associated with the article that are the pages of the article. Each article can include static assets, such as text, and dynamic assets, such as embedded videos or slide shows containing a series of sequentially displayed images.

The digital magazine application can include a prioritization module. If a page of an article in the digital magazine includes a slide show, the prioritization module can assign the highest priority to all images included in the slide show. The priority of the images associated with the slide show can be based on, for example, the slide show being a dynamic asset with a lower resource requirement. The prioritization module can assign the next highest priority to the text in a subsequent page in the currently displayed article of the digital magazine, a first page of a subsequent article in the digital magazine, and a first page of a previous article in the digital magazine. The priority of the text and image assets in the respective pages can be based on the text and images being included in pages accessible from the currently displayed page, the text and images being static assets, and the text and image assets having low resource requirements. The prioritization module can assign the next highest priority to a video used in one of the pages of the current article. The priority of the video can be based on the video being included in a page accessible from a currently displayed page, the video being a dynamic asset, and the video having a greater resource requirement than, for example, the slide show.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
   prioritizing, by an application executed by a processor, loading of assets from electronic content into a memory, wherein prioritizing the assets comprises assigning respective priorities to the assets based on which of the assets are used in one or more accessible views that are directly accessible from a view currently displayed by the application, wherein assigning the respective priorities comprises:
      determining that the one or more accessible views are accessible via a first type of navigation input,
      identifying a first frequency with which the first type of navigation input has historically been used to access views within the application,
      determining that one or more additional accessible views are accessible via a second type of navigation input that is different from the first type of navigation input;
      identifying a second frequency with which the second type of navigation input has historically been used to access views within the application, and
      assigning a first priority to the one or more accessible views and a second priority different from the first priority to the one or more additional accessible views, wherein the first and second priorities are assigned based on the respective first and second frequencies for the respective first and second types of navigation input; and
   loading, by the application, at least some of the assets into the memory based on a priority of the respective assets.

2. The method of claim 1, further comprising:
   assigning, by the application, a primary priority to assets used in one or more primary views, wherein the one or more primary views comprise the one or more accessible views that are directly accessible from the view currently displayed by the application; and
   assigning, by the application, a secondary priority to assets used in one or more secondary views, wherein the one or more secondary views comprise one or more accessible views that are directly accessible from the one or more primary views.

3. The method of claim 1, wherein assigning the respective priorities to the assets based on which of the assets are used in the one or more accessible views that are directly accessible from the view currently displayed comprises determining that the one or more accessible views are accessible in response to input received via one or more navigation objects displayed in the view currently displayed by the application, wherein the one or more navigation objects are configured to receive input representing a command to navigate to the one or more accessible views.

4. The method of claim 1, wherein the one or more accessible views comprise a plurality of views and wherein assigning the respective priorities to the assets based on which of the assets are used in the one or more accessible views that are directly accessible from the view currently displayed comprises determining that the plurality of views are directly accessible in response to a touch screen navigation gesture, wherein each of the plurality of views is accessible in response to the touch screen navigation gesture with a respective direction being received in the view currently displayed, wherein different directions of the touch screen navigation gesture are configured to access different ones of the plurality of views.

5. The method of claim 1, wherein the respective priorities are also assigned to the assets based on resource requirements required for the assets, wherein a resource requirement comprises at least one of an amount of memory required for loading the respective asset and an amount of processing time required for loading the respective asset.

6. The method of claim 1, wherein assigning the respective priorities to the assets based on which of the assets are used in the one or more accessible views that are directly accessible from the view currently displayed comprises further comprises:
   assigning a third priority to a first one of the assets based on the first one of the assets being accessible via a network; and
   assigning a fourth priority to a second one of the assets based on the second one of the assets being accessible from a local memory device accessible by the processor, wherein the third priority is different from the fourth priority.

7. The method of claim 1, wherein assigning the respective priorities to the assets based on which of the assets are used in the one or more accessible views that are directly accessible from the view currently displayed comprises further comprises assigning the respective priorities based on an attribute associated with rendering the respective assets for display.

8. The method of claim 7, wherein the attribute is a scaling factor, wherein the scaling factor comprises a magnification of a respective asset.

9. The method of claim 7, wherein the attribute identifies whether a respective asset is a static asset having a static appearance as rendered for display or a dynamic asset having a changeable appearance when rendered for display and wherein assigning the respective priorities to the assets based on which of the assets are used in the one or more accessible views that are directly accessible from the view currently displayed further comprises:
assigning a third priority to a first one of the assets that is the static asset; and
assigning a fourth priority to a second one of the assets that is the dynamic asset, wherein the third priority is different from the fourth priority.

10. The method of claim 1, wherein prioritizing the loading of at least some of the assets comprises:
assigning a third priority, wherein the third priority is higher than a fourth priority, to one or more related static assets associated with a dynamic asset used in the view currently displayed by the application;
assigning the fourth priority, wherein the fourth priority is higher than a fifth priority, to one or more static assets used in the one or more accessible views, wherein respective static assets are further prioritized based on a resource requirement required for loading the respective static assets; and
assigning the fifth priority to dynamic assets used in the one or more accessible views, wherein respective dynamic assets are further prioritized based on a resource requirement required for loading the respective dynamic assets.

11. The method of claim 1, wherein prioritizing the assets is further based on which of the assets are used in one or more related views as specified by an application-specific rule and corresponding to the view currently displayed by the application, wherein the application-specific rule identifies one or more criteria common to content of the view currently displayed and content of the one or more related views.

12. A computing system comprising:
a processor configured for executing instructions stored in non-transitory computer-readable medium on one or more devices providing a multimedia application;
wherein the multimedia application comprises one or more modules configured to perform operations comprising:
prioritizing loading of assets into a memory, wherein prioritizing the assets comprises assigning respective priorities to the assets based on which of the assets are used in one or more accessible views that are directly accessible from a view currently displayed, wherein assigning the respective priorities comprises:
determining that the one or more accessible views are accessible via a first type of navigation input,
identifying a first frequency with which the first type of navigation input has historically been used to access views within the application,
determining that one or more additional accessible views are accessible via a second type of navigation input that is different from the first type of navigation input,
identifying a second frequency with which the second type of navigation input has historically been used to access views within the application, and
assigning a first priority to the one or more accessible views and a second priority different from the first priority to the one or more additional accessible views, wherein the first and second priorities are assigned based on the respective first and second frequencies for the respective first and second types of navigation input, and
loading at least some of the assets into the memory based on a priority of the assets.

13. The computing system of claim 12, wherein determining whether each of the assets is used in the one or more accessible views that are directly accessible from the view currently displayed comprises determining whether the view currently displayed includes one or more navigation objects configured for accessing the one or more accessible views in response to receiving input representing one or more commands to navigate to the one or more accessible views.

14. The computing system of claim 12, wherein determining whether each of the assets is used in the one or more accessible views that are directly accessible from the view currently displayed comprises determining whether a respective asset is comprised in an adjacent view, wherein the adjacent view is accessible using a command in the view currently displayed to navigate to a next view in a series of views.

15. A non-transitory computer-readable medium embodying program code executable by a computing system, the program code comprising:
program code for prioritizing loading of assets from electronic content into a memory, wherein prioritizing the assets comprises assigning respective priorities to the assets based on which of the assets are used in one or more accessible views that are directly accessible from a view currently displayed by the application, wherein assigning the respective priorities comprises:
determining that the one or more accessible views are accessible via a first type of navigation input,
identifying a first frequency with which the first type of navigation input has historically been used to access views within the application,
determining that one or more additional accessible views are accessible via a second type of navigation input that is different from the first type of navigation input;
identifying a second frequency with which the second type of navigation input has historically been used to access views within the application, and
assigning a first priority to the one or more accessible views and a second priority different from the first priority to the one or more additional accessible views, wherein the first and second priorities are assigned based on the respective first and second frequencies for the respective first and second types of navigation input; and
program code for loading at least some of the assets into the memory based on a priority of the respective assets.

16. The method of claim 9, wherein the static asset comprises at least one of a text asset and an image asset, and wherein the dynamic asset comprises a video asset.

17. The method of claim 1, wherein assigning respective priorities to the assets based on which of the assets are used in one or more accessible views that are directly accessible from the currently displayed view further comprises:
- determining that the page currently displayed by the application is included in a first article that is tagged with a identifier;
- determining that one or more additional pages are included in a second article that is tagged with the identifier, wherein the second article is different from the first article; and
- prioritizing the assets in the one or more additional pages based on the first article and the second article being tagged with the identifier.

18. The method of claim 1, wherein the first type of navigation input comprises a scrolling input and the second type of navigation input comprises clicking a navigation object.

* * * * *